(12) United States Patent
Gao et al.

(10) Patent No.: US 11,016,441 B2
(45) Date of Patent: May 25, 2021

(54) OPTIMIZATION OF WAVELENGTH SELECTIVE SWITCH USING PHASE CONTROL OF LIQUID CRYSTAL SPATIAL LIGHT MODULATOR

(71) Applicant: II-VI Delaware, Inc., Wilmington, DE (US)

(72) Inventors: Kun Gao, San Jose, CA (US); Jack R. Kelly, Lake Mary, FL (US); Helen Chen, Cupertino, CA (US); Guomin Jiang, Fremont, CA (US); Xinran Wang, Mountain View, CA (US); Lixin (Lawrence) Wang, Fremont, CA (US); Qingyu (Tom) Li, Cupertino, CA (US); Haiji J. Yuan, Cupertino, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 164 days.

(21) Appl. No.: 16/278,351

(22) Filed: Feb. 18, 2019

(65) Prior Publication Data
US 2020/0264558 A1   Aug. 20, 2020

(51) Int. Cl.
*G03H 1/08*   (2006.01)
*G03H 1/16*   (2006.01)

(52) U.S. Cl.
CPC .............. *G03H 1/0808* (2013.01); *G03H 1/16* (2013.01)

(58) Field of Classification Search
CPC ...... G03H 1/0808; G03H 1/0841; G03H 1/16; G03H 2001/0816; G03H 2001/086; G03H 2001/0224; G03H 2001/0228; G03H 2225/11; G03H 2225/12; G03H 2225/22; G03H 2240/53; G03H 2240/61; G02B 5/203; G02B 5/32

USPC ............................ 359/29, 279; 398/158, 279
See application file for complete search history.

(56) References Cited

U.S. PATENT DOCUMENTS

| | | |
|---|---|---|
| 5,706,067 A | 1/1998 | Colgan et al. |
| 7,417,706 B2 | 8/2008 | Holmes |
| 7,457,547 B2 | 11/2008 | Frisken et al. |
| 8,078,019 B2 | 12/2011 | Cohen et al. |
| 8,525,772 B2 | 9/2013 | Tanaka et al. |
| 8,643,822 B2 | 2/2014 | Tan et al. |

(Continued)

OTHER PUBLICATIONS

Nakajima, Mitsumasa et al., "Analysis and suppression of higher-order diffractions in liquid-crystal-based spatial light modulator for phonotic switch application", Japanese Journal of Applied Physics 56, (2017), pp. 09NC01-1 to 09NC01-6.

*Primary Examiner* — Marin Pichler
(74) *Attorney, Agent, or Firm* — Wendy W. Koba (57) ABSTRACT

A two-step optimization process is utilized to define an optimal phase profile for a LCoS spatial light modulator. The two-step optimization process first utilizes a nonlinear constrained optimization (NCO) program to determine the specific parameters required to obtain an optimal phase profile (hologram), where the "optimal phase profile" is typically defined as that profile which achieves maximum diffraction efficiency for optical switching. Following this first step, phase scaling (and perhaps an adjustment in the number of pixels per period) is employed to slightly modify the values of the optimal phase profile to effectively suppress crosstalk peaks. If any orders still exhibit an unacceptable level of crosstalk, these orders are then subtracted from the phase profile to create the final design.

4 Claims, 6 Drawing Sheets

(56) References Cited

U.S. PATENT DOCUMENTS

| | | |
|---|---|---|
| 8,867,917 B2 | 10/2014 | Frisken et al. |
| 8,977,079 B2 | 3/2015 | McLaughlin |
| 9,041,897 B2 | 5/2015 | Yuan et al. |
| 9,380,361 B2 | 6/2016 | You et al. |
| 9,521,473 B2 | 12/2016 | Wagener |
| 9,547,276 B2 | 1/2017 | Collings et al. |
| 9,588,300 B2 | 3/2017 | Nakajima et al. |
| 9,632,391 B2 | 4/2017 | Wagener et al. |
| 2016/0139559 A2* | 5/2016 | Holmes ................. G02B 6/266 359/9 |

* cited by examiner

OPTIMIZATION OF WAVELENGTH SELECTIVE SWITCH USING PHASE CONTROL OF LIQUID CRYSTAL SPATIAL LIGHT MODULATOR

TECHNICAL FIELD

The present invention relates to a method of optimizing an optical wavelength selective switch (WSS) and, more particularly, to the utilization of an iterative process to determine an optimized phase profile for the associated liquid crystal spatial light modulator (SLM).

BACKGROUND

A typical configuration of a WSS is as a 1×N device, where a given input signal is directed to one-of-N output transmission paths (ports). The input signal includes several different wavelength channels, and through the working of the switch each wavelength channel from the input signal can be dynamically switched (i.e., routed) to any one of the output ports, independent of how all of the other wavelength channels are routed.

One type of WSS relies on the use of a liquid crystal (LC)-based element to provide the wavelength switching, where electrical signals applied to the LC structure provide the desired beam steering between the input port and the multiple output ports. An exemplary type of LC beam steering arrangement comprises a "liquid crystal on silicon" (LCoS) pixel array. An operating principle of the LCoS pixel array lies in the fact that different voltages are loaded on different individual pixels of the LCoS; that is, each pixel is separately addressable and controllable. As a result of the birefringent effect of the LC material, the different voltages correspond to different phase delays and can therefore configure the LCoS pixel array to exhibit the properties of a blazed grating. Therefore, a diffraction angle of incident light may be controlled merely by changing the grating period of this pseudo-blazed grating, which is provided by adjusting the voltages applied to the various LC pixels. This adjustment in voltage allows diffractive light to be output at different ports of the WSS, implementing a WSS function.

While useful in performing switching, the LC-based WSS is limited in terms of the levels of insertion loss and crosstalk resulting in the function structure. That is, due to phase reset and pixelization effect, the ideal phase blazed grating (or piecewise linear ramp) cannot minimize these quality factors to values required for optical communication network applications.

SUMMARY OF THE INVENTION

The needs remaining in the prior art are addressed by the present invention, which relates to a method of optimizing an optical wavelength selective switch (WSS) and, more particularly, to the utilization of an iterative process to determine an optimized phase profile for the associated liquid crystal spatial light modulator (SLM).

In accordance with the principles of the present invention, a two-step optimization process is utilized to define an optimal phase profile for a LCoS SLM. That is, a process is used to create a programmable hologram that satisfies the attenuation level requirement at a selected output port (hereinafter referred to as the "target port"), while also minimizing the crosstalk level at the remaining, non-selected output ports.

In further accordance with the principles of the present invention, the two-step optimization process first utilizes a nonlinear constrained optimization (NCO) program to determine the specific parameters required to obtain the optimal phase profile (hologram), where the "optimal phase profile" is typically defined as that profile which achieves maximum diffraction efficiency for optical switching. Following this first step, phase scaling (and perhaps an adjustment in the number of pixels per period) is employed to slightly modify the values of the optimal phase profile to effectively suppress crosstalk peaks. If any orders still exhibit an unacceptable level of crosstalk, these orders are then subtracted from the phase profile to create the final design. In some applications of WSS, a crosstalk threshold of −35 dB is considered as acceptable.

An exemplary WSS formed in accordance with the principles of the present invention may take the form of a fiber array (having a plurality of ports including an input port and multiple output ports), a liquid crystal on silicon (LCoS) panel including a control board for providing selected pixel electrode voltage levels associated with displaying a hologram in the form of a phase profile configured to provide switching of a defined wavelength of an incoming optical signal between the input port and one or more of the multiple output ports, and a processor module coupled to the LCoS panel, the processor module creating an optimized phase profile for wavelength selective switching and communicating the optimized phase profile information to the LCoS panel control board. Particularly, the processor module is configured to: (1) perform a nonlinear constrained optimization (NCO) process based on selected port criteria to create an optimized phase profile that satisfies a diffraction efficiency criteria:

$$\eta = \frac{\Sigma_k |c_k|^2}{\Sigma_{m=-\infty}^{+\infty} |c_m|^2}$$

where $c_k$ is a $k^{th}$ Fourier coefficient of a continuous phase-only function, the numerator is the sum of all selected output ports and the denominator is sum over the complete set of multiple output ports, and (2) perform phase adjustments on the optimized phase profile, including phase scaling, pixel number and order subtraction, until crosstalk at all non-selected output ports is less than a predetermined threshold level.

An exemplary method of performing the optimization process of the present invention may take the form of optimizing the operation of a wavelength selective switch (WSS) utilizing a liquid crystal on silicon (LCoS) panel by creating an optimized phase profile for phase-only switching that provides a selected level of diffraction efficiency with minimal crosstalk. One specific organization of the method steps include: providing a control board for use with the LCoS panel, the control board providing selected pixel electrode voltage levels associated with displaying a hologram in the form of a phase profile configured to provide switching of a defined wavelength of an incoming optical signal between the input port and one or more of the multiple output ports, and creating an optimized phase profile for wavelength selective switching and communicating the optimized phase profile information to the LCoS panel control board. The creating step including the sub-steps of: (1) performing a nonlinear constrained optimization (NCO) process based on selected port criteria to create an optimized phase profile that satisfies a diffraction efficiency criteria:

$$\eta = \frac{\Sigma_k |c_k|^2}{\Sigma_{m=-\infty}^{+\infty} |c_m|^2}$$

where $c_k$ is a $k^{th}$ Fourier coefficient of a continuous phase-only function, the numerator is the sum of all selected output ports and the denominator is sum over the complete set of multiple output ports; and (2) performing phase adjustments on the optimized phase profile, including phase scaling, pixel number and order subtraction, until crosstalk at all non-selected output ports is less than a predetermined threshold level.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

A programmable optical phase modulator such as a LCoS device produces a calculated phase shift at a given pixel location in a pixel array. Due to the limited thickness and actuation of a LCoS device, the total phase shift that can be achieved at any given location is limited. This limitation is circumvented in a LCoS device by the application of a segmentation technique, similar to that used to form a Fresnel lens by compressing the surface power of a lens into a plano surface. Specifically, the total phase shift desired is usually modulo-$2\pi$ at the wavelength of interest. The resultant phase is then always less than $2\pi$. Unfortunately, this segmentation technique, in combination with the nature of the liquid crystal material, introduces scattering of light in directions that a non-segmented pattern would not produce, which is a major reason that crosstalk is problematic in conventional LCoS WSS configurations.

As will be described in detail below, the present invention is directed to utilizing optimization processes to define a specific hologram for a given beam steering request that satisfies the diffraction efficiency at the desired output port (s), while also minimizing (suppressing) crosstalk at non-selected ports. The techniques of the present invention utilize computer-generated holograms comprising patterns of programmable phase-modulated pixels dynamically displayed on a suitably-designed LCoS display. In particular, the configurations formed in accordance with the principles of the present invention utilize parallel-aligned nematic LCoS devices that provide a phase-only modulation of the reflected light beam, maintaining the linear polarization of the incoming light beam. Said another way, these devices do not convert the polarization of the incident light into the orthogonal polarization in the reflection.

Figure 1:
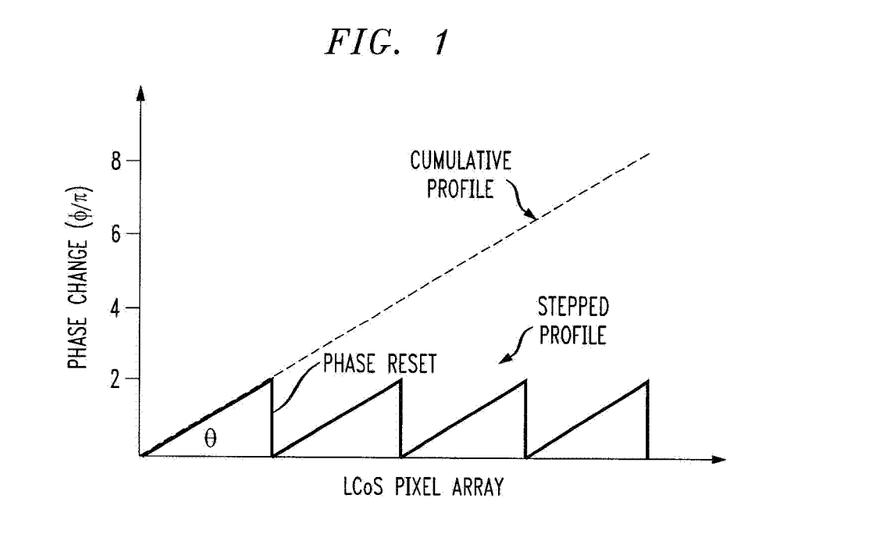
FIG. 1 is a simplified block diagram illustrating the basic principles of WSS.

Conventional LCoS devices used in a WSS application typically employ simple pixel patterns that create basic, well-known periodic grating holograms (typically linear or blazed gratings). FIG. 1 illustrates an example of a periodic, stepped phase shift profile that may be produced across a region of a LCoS device in the y-axis direction. The periodic, stepped phase shift profile produces a cumulative phase profile, also referred to as a cumulative steering profile. As will be discussed in detail below, this steering profile is produced by driving each individual pixel with a predetermined voltage to provide a desired phase change. The periodic nature of phase is utilized to reduce the required drive voltage. Therefore, a periodic, stepped voltage signal will produce the periodic, stepped phase shift profile, which in turn produces the cumulative phase profile. Phase resets are typically set to occur at multiples of $2\pi$ radians. When acting on an individual wavelength component, the phase profile provides a steering angle proportion to or equal to $\theta$ (where $\theta=\lambda$/period for the small angle case, in accordance with well-known diffraction principles). Accordingly, by proper adjustment of the periodic, stepped phase shift profile, the wavelength components can be selectively directed to a desired one (or more) of the selected output ports.

It has been found, however, that the need for phase reset and the use of a pixelized array have the potential to create unacceptable levels of crosstalk and likewise increase insertion loss at the selected output port. As described in detail below, it is proposed to use a two-step process to design a programmable hologram that overcomes these limitations. The two-step process includes the initial creation of an optimal phase profile (optimized with respect to maximum diffraction efficiency), followed by phase scaling, pixel number adjustment and/or order subtraction to further reduce unwanted crosstalk.

Figure 2:
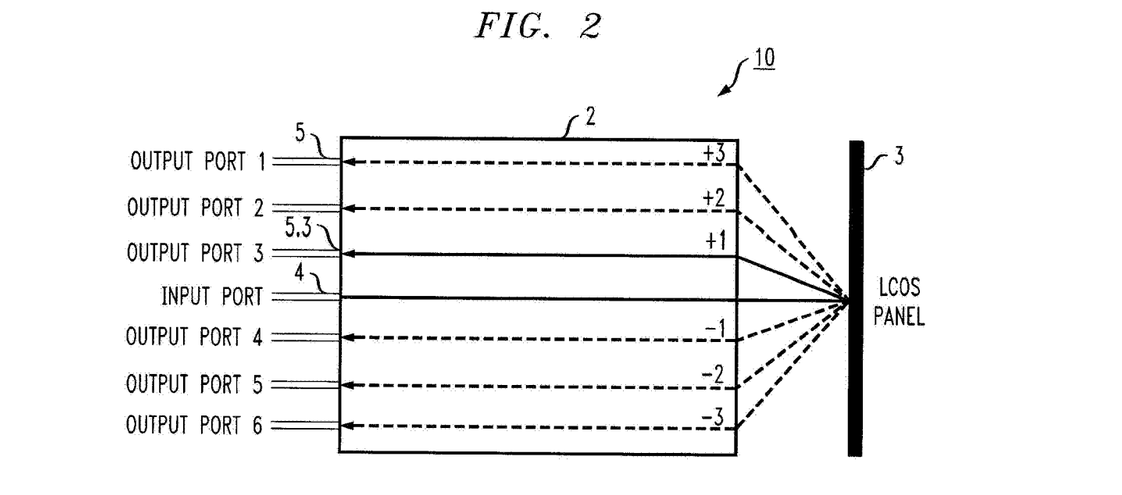
FIG. 2 is a diagram of an exemplary WSS utilizing a LCoS device configuration optimized by the application of the method of the present invention.

FIG. 2 illustrates a simplified 1×6 WSS 1, useful in illustrating the basic principles of crosstalk. WSS 1 utilizes a switching module 2 in combination with a LCoS pixel array 3 to provide switching between an input port 4 (typically coupled to a fiber forming part of a fiber array) and one (or more) output ports 5. For the purposes of explanation, switching module 2 has been controlled to select output port 5.3. In FIG. 2, light entering input port 4 undergoes a series of processes (which may include deflection processing, wavelength demultiplexing and multiplexing processes, and the like) within switching module 2, and is then incident on LCoS pixel array 3. A corresponding pixel sector (i.e., a portion of a linear pixel array) is controlled via applied electrical signals in the manner described above to create a hologram (phase profile) that directs/steers the +1-order diffracted beam into output port 5.3.

Figure 3:
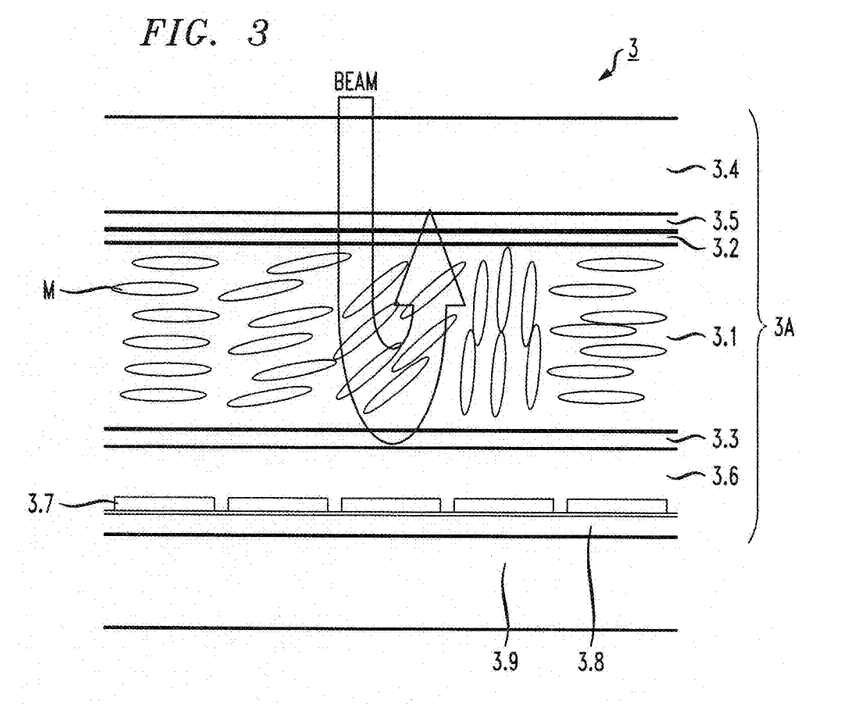
FIG. 3 is a cut-away side view of a portion of an exemplary LCoS device, illustrating a beam steering capability.
Figure 4:
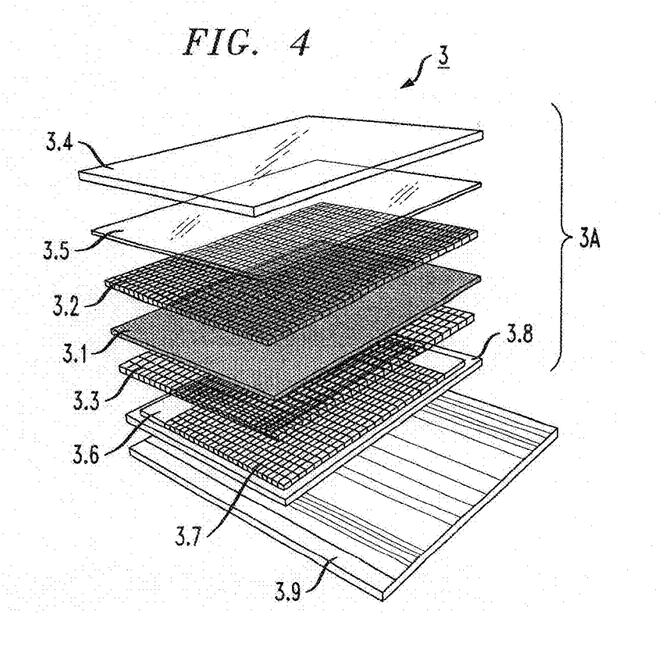
FIG. 4 is an isometric view of an exemplary LCoS device for use in the system of the present invention.

FIG. 3 is a simplified diagram of the beam steering property of LCoS pixel array 3. In particular, FIG. 3 is an enlarged, cut-away side view (not to scale) of a portion of LCoS pixel array 3, where FIG. 4 is an isometric, exploded view of the complete structure. Referring to both FIGS. 3 and 4, LCoS pixel array 3 is shown as comprising a liquid crystal layer 3.1 disposed between alignment layers 3.2 and 3.3. A cover glass 3.4 and transparent electrode 3.5 is disposed as shown above alignment layer 3.2. A CMOS circuit substrate 3.6 is positioned underneath alignment layer 3.3 and is provided with a plurality of pixel electrodes 3.7, arranged in the desired two-dimensional array pattern (as best shown in FIG. 4). As mentioned above, the pixel electrodes are separately addressable. A reflective lower surface 3.8 of CMOS circuit substrate 3.6 may be included to improve the optical efficiency of the array. A control layer 3.9 provides the electrical interface between electrodes 3.7 and the external control structure (not shown) that defines the specific phase profile. The collection of layers 3.1-3.8 will be referred to at times in the following discussion as "LCoS display 3A", with control layer 3.9 remaining defined as a separate element that communicates with other system components associated with the optimization process of the present invention.

In the arrangement as shown in FIG. 3, the voltages applied to the individual electrodes cause individual molecules M within liquid crystal layer 3.1 to rotate and create a specific phase profile (hologram) that steers an incoming beam toward a selected output port.

Referring back to FIG. 2, this beam steering typically results in light at other diffraction orders entering the other (non-selected) output ports. These ports are associated with higher-order modes of the diffraction pattern, shown as the +2-order, +3-order, and the −1, −2 and −3 orders in FIG. 2. Once entering these non-selected output ports, this light is difficult to eliminate and may result in an unacceptable level of crosstalk.

Figure 5:
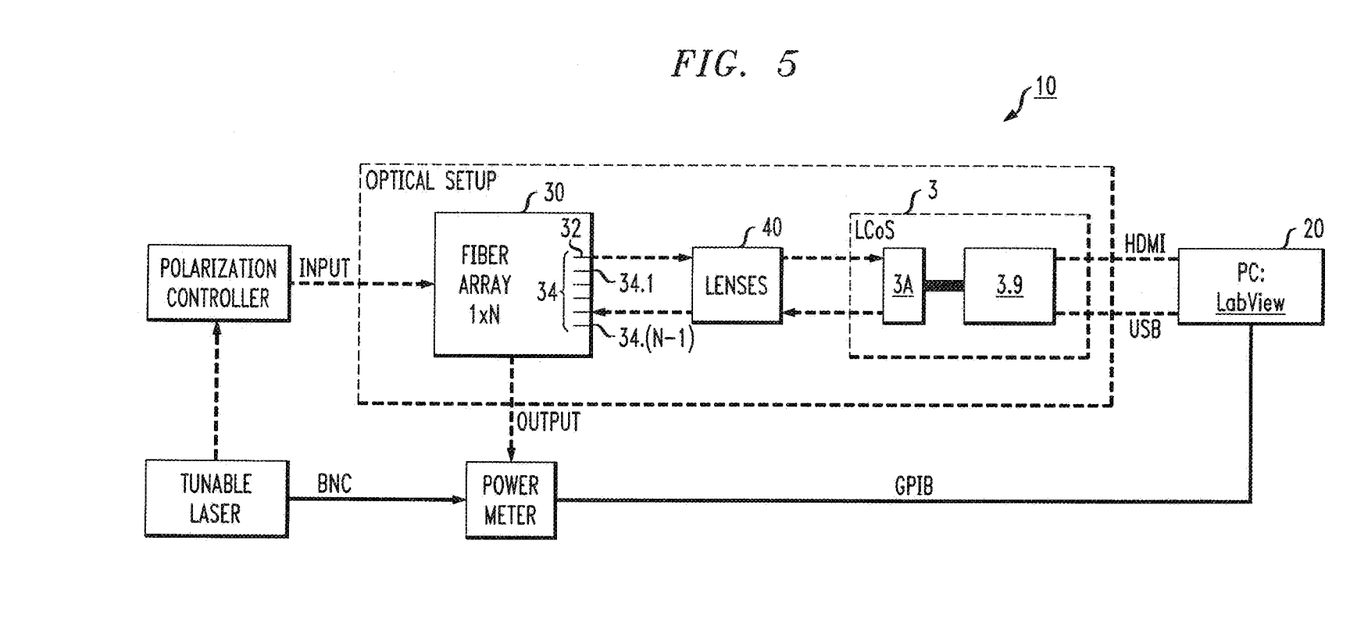
FIG. 5 is a simplified block diagram of 1×N WSS formed in accordance with the present invention.

FIG. 5 illustrates an exemplary 1×N WSS 10 formed in accordance with the present invention that creates a programmable hologram specifically tailored to optimize the beam profile such that diffraction efficiency is maximized and crosstalk into non-selected ports is well below an acceptable level. As shown in FIG. 5, WSS 10 includes a LCoS device 3A, as described above. In accordance with the present invention, control layer 3.9 interacts with LCoS device 3A (in particular, CMOS electrode structure 3.7) to create the desired diffraction pattern. In accordance with the principles of the present invention, a separate processor module 20 is utilized to generate a set of optimized phase profile parameters, and transmit that data to control layer 3.9 so that LCoS device 3A projects the desired pattern. As discussed below, processor module 20 functions to optimize the phase profile of the reflected beam such that high efficiency ($\eta$) at the target port is achieved with minimal crosstalk (i.e., with minimum levels of the beam entering non-selected output ports). As mentioned above, any ports exhibiting crosstalk above −35 dB is considered unacceptable and needs to be reduced. The optimization process of the present invention is used to generate a phase profile that exhibits crosstalk below this level.

For the WSS application, a typically array is on the order of 1920×1080, although other sizes are possible. Indeed, it is to be understood that the two-step optimization process of the present invention may be utilized to improve the operation of any type of LCoS panel, regardless of the size of the array, size of an individual pixel, LC material, cell thickness, etc. Processor module 20, as described in detail below, performs the two-step optimization process of the present invention to define the specific signal values applied to the individual pixels of any appropriate LCoS panel. to generate the desired hologram pattern.

Also shown in FIG. 5 is a fiber array 30 that defines both an input port 32 and a plurality of output ports 34.1, 34.2, . . . 34.(N−1) for WSS 10. A lensing system 40 provides the necessary collimation/focusing along the optical signal path as a light beam makes a round trip between fiber array 30 and LCoS device 3A (i.e., a light beam enters WSS 10 at input port 32, propagates through lensing system 40 and reaches LCoS device 3A, where it is split into distinct wavelengths and the selected wavelength is directed into a selected output port 34.x).

The determination of an optimized grating phase profile (in terms of a programmable hologram) is based on the theory of optimal beam splitting. Initially, this entails determining a continuous phase-only function:

$$f(x) = \exp[i\varphi(x)]$$

that generates a set of target diffraction orders with maximum overall efficiency $\eta$, where $\eta$ is defined as the sum of the normalized intensities of each target order. For the purposes of the present invention, a "target order" is presumed to be a selected output port.

Considering a one-dimensional continuous phase grating with a period of $2\pi$, $$c_k = \frac{1}{2\pi} \int_{-\pi}^{\pi} \exp[i\varphi(x)] \exp[-ikx] dx,$$

where $c_k$ is the $k^{th}$ Fourier coefficient of $f(x)$ and x is defined as the spatial coordinate (position) along the array. The phase-only function for optimal beam splitting is calculated as:

$$\exp[i\varphi(x)] = \frac{s(x)}{|s(x)|}, \text{ where}$$

$$s(x) = \sum_k \mu_k \exp[i\alpha_k] \exp[ikx],$$

where k in the integer index of each of the N target ports, $\alpha_k$ is the numerical parameter representing the phase of the $k^{th}$ diffraction order, and $\mu_k$ is the numerical parameter representing the amplitude of the $k^{th}$ diffraction order.

The total efficiency $\eta$ of the optimized grating is then defined as:

$$\eta = \frac{\Sigma_k |c_k|^2}{\Sigma_{m=-\infty}^{+\infty} |c_m|^2},$$

where the numerator is the sum of all target ports (where k=1 in the case where there is a single target port), and the denominator is sum over the complete set of possible output ports. It is this efficiency $\eta$ that is optimized in the first step of the inventive two-step optimization process and used to determine the specific values of $\mu$ and $\alpha$ that create an optimal phase profile (hologram) with the highest possible efficiency.

Figure 6:
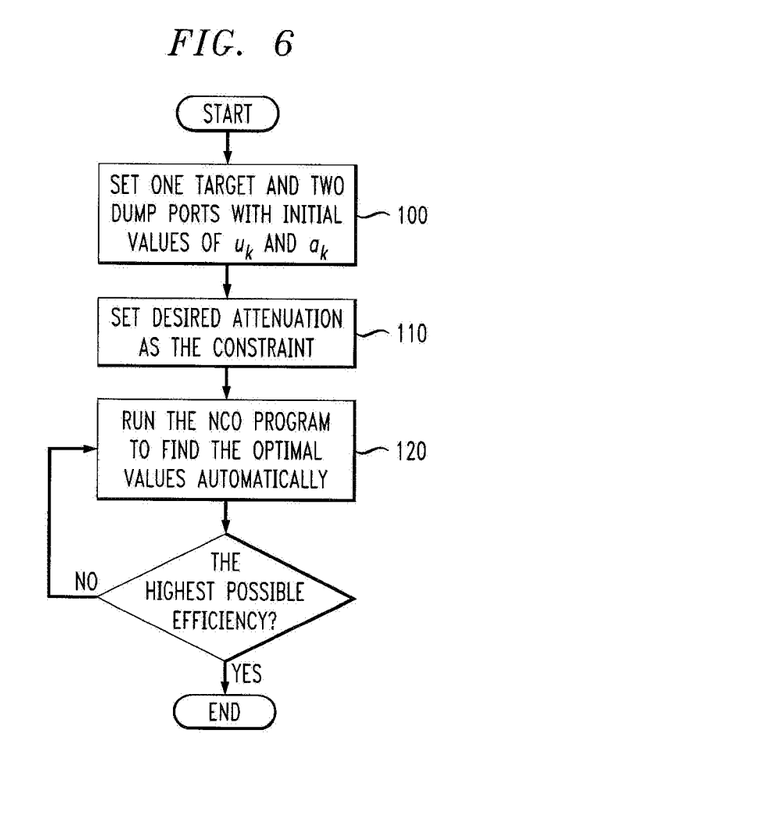
FIG. 6 contains a flowchart of an exemplary sequence of steps that may be used to implement the first step (NCO step) of the optimization process of the present invention.
Figure 7:
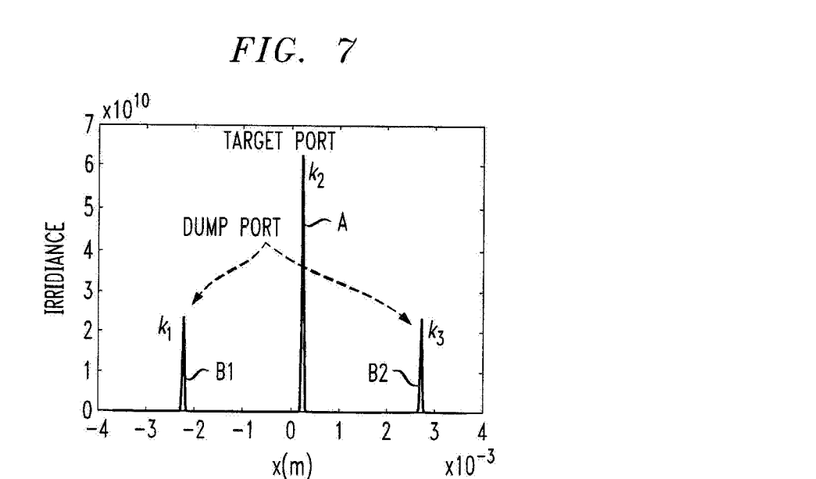
FIG. 7 is a diagram of a set of ports associated with a WSS, identifying a "target" port and a pair of "dump" ports, used in performing the process of FIG. 6.

FIG. 6 contains a flowchart showing an exemplary process that may be used in accordance with the present invention to perform this first step of the two-step optimization process. In this example, the desire is to create an optimized hologram for a single output port (i.e., a single "target" port). As shown, a nonlinear constrained optimization routine is utilized to arrive at a solution for $(\mu,\alpha)$ yielding the highest value for efficiency $\eta$. The process begins at step 100 with the selection of a target port A and a pair of "dump" ports B1, B2. FIG. 7 is a diagram showing an exemplary set of such ports. For the purposes of the present invention, the "dump" ports are the diffraction orders that would receive the greatest amount of unwanted light, attributed to crosstalk. The general rule is to select a pair of dump ports that are symmetric with respect to the target port, typically the 0-order port and the second-order port. Step 100 also includes the selection of initial values of amplitude $\mu$ and phase $\alpha$ for each port.

The next step (step 110) defines the parameter that is to be constrained during the optimization process. In this example, "desired attenuation" is selected to be the constrained parameter during the following process. For the purposes of the present invention, "desired attenuation" is associated with the energy that appears at dump ports B1, B2. Moving to step 120, the optimization process begins with the initial execution of the nonlinear constrained optimization (NCO) with the selected parameter values, including the calculation of the efficiency $\eta$. The NCO program will continue to execute, modifying all parameters except for attenuation, until a sufficiently high efficiency is obtained.

A second step in the inventive two-step process provides phase scaling to adjust this nominal interval and further reduce crosstalk. In particular, it is proposed to increase (or decrease) the size of the interval until an acceptable crosstalk level is obtained. Phase scaling is preferably performed by keeping the same number of steps in a given interval (say, 100 steps per interval) and changing the size of each step by the same $\Delta$ amount. This phase scaling thus modifies the projected hologram as created during the NCO process as outlined in FIG. 6. If the phase scaling itself does not yield an acceptable result, the number of pixels per period can be slightly changed, modifying the fly-back region of each step, thus reducing the influences of the LC fringe field.

Figure 8:
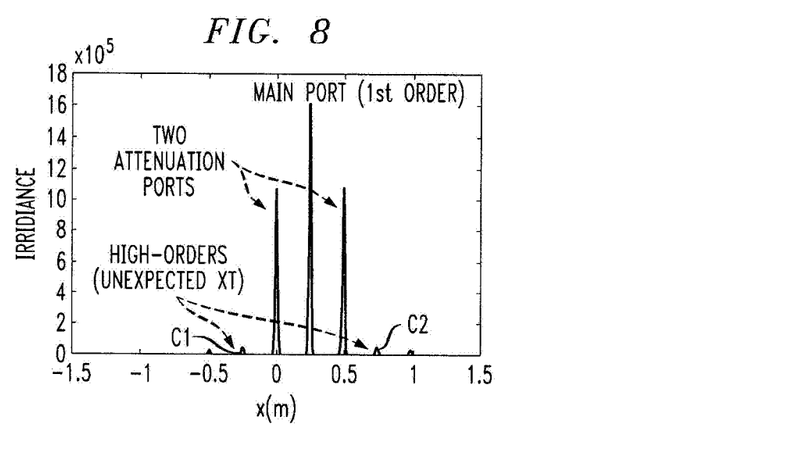
FIG. 8 illustrates an exemplary set of diffracted output beams, where unexpected crosstalk appears at some ports at the completion of the first optimization step as outlined in FIG. 6.

If additional improvement in minimizing crosstalk is desired, an "order subtraction" process may be utilized in conjunction with phase scaling. For order subtraction, the Fourier components from s(x) that correspond to those orders still exhibiting too much crosstalk are eliminated. FIG. 8 illustrates an exemplary set of diffracted output beams where unexpected crosstalk still appears at output ports C1 and C2. Utilization of the order subtract process, the Fourier components associated with these orders are removed from the phase profile. In particular, the subtraction process modifies s(x) as follows:

$$s(x) \to s(x) - \Sigma \mu_n \exp(i\alpha_n) \exp(inx),$$

where the sum is over the n undesirable diffraction peaks (here, ports C1 and C2). This will be able to reduce the individual crosstalk peaks in an individual manner, with slight adjustments of each $\mu_n$ and $\alpha_n$.

Figure 9:
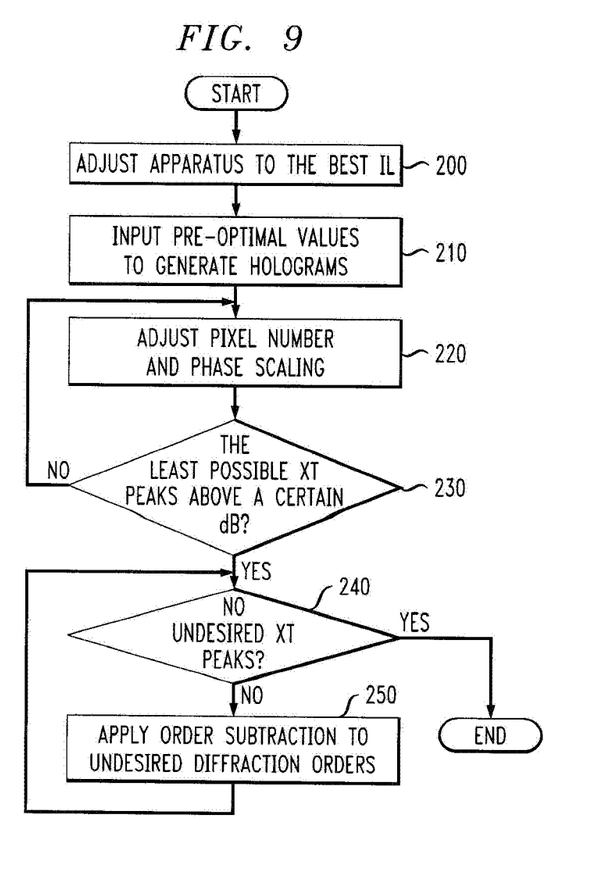
FIG. 9 is a flowchart illustrating an exemplary sequence associated with performing the second step of the two-step optimization process of the present invention.

FIG. 9 is a flowchart illustrating the addition of this second step to further suppress crosstalk and optimize the initial hologram created by the NCO process outlined in FIG. 6. As shown, the process starts by first performing an alignment between components to provide minimal insertion loss (step 200). This may entail an active alignment process (i.e., measurements of power level between an input port and a selected output port, and adjustments in the positioning of LCoS device 3 until coupling efficiency is maximized).

Next, the values of $\mu$ and $\alpha$ generated by the first step of the process are provided as inputs to this crosstalk suppression step in step 210. An initial adjustment in phase scaling (e.g., changing the phase reset to a value less than $2\pi$) is made to the initial hologram in step 220. The crosstalk peaks are then measured (step 230), and if the level of crosstalk is still too high, the process loops back to step 220 and a different phase reset value is tried. If phase scaling is not successful in reducing crosstalk to a sufficient level, the pixel number is then slightly adjusted to reduce the influence of the LC fringe field. In particular, these two parameters should cooperate with each other for the best solution as a manual calibration.

At this point, another determination is made (step 240) to determine if any undesired crosstalk peaks still remain. If phase scaling (and possible pixel number adjustment) have adequately provided crosstalk suppression, the process ends. Otherwise, order subtraction is utilized (step 250) in the manner described above to remove selected higher-order terms until the crosstalk has been sufficiently minimized.

Figure 10:
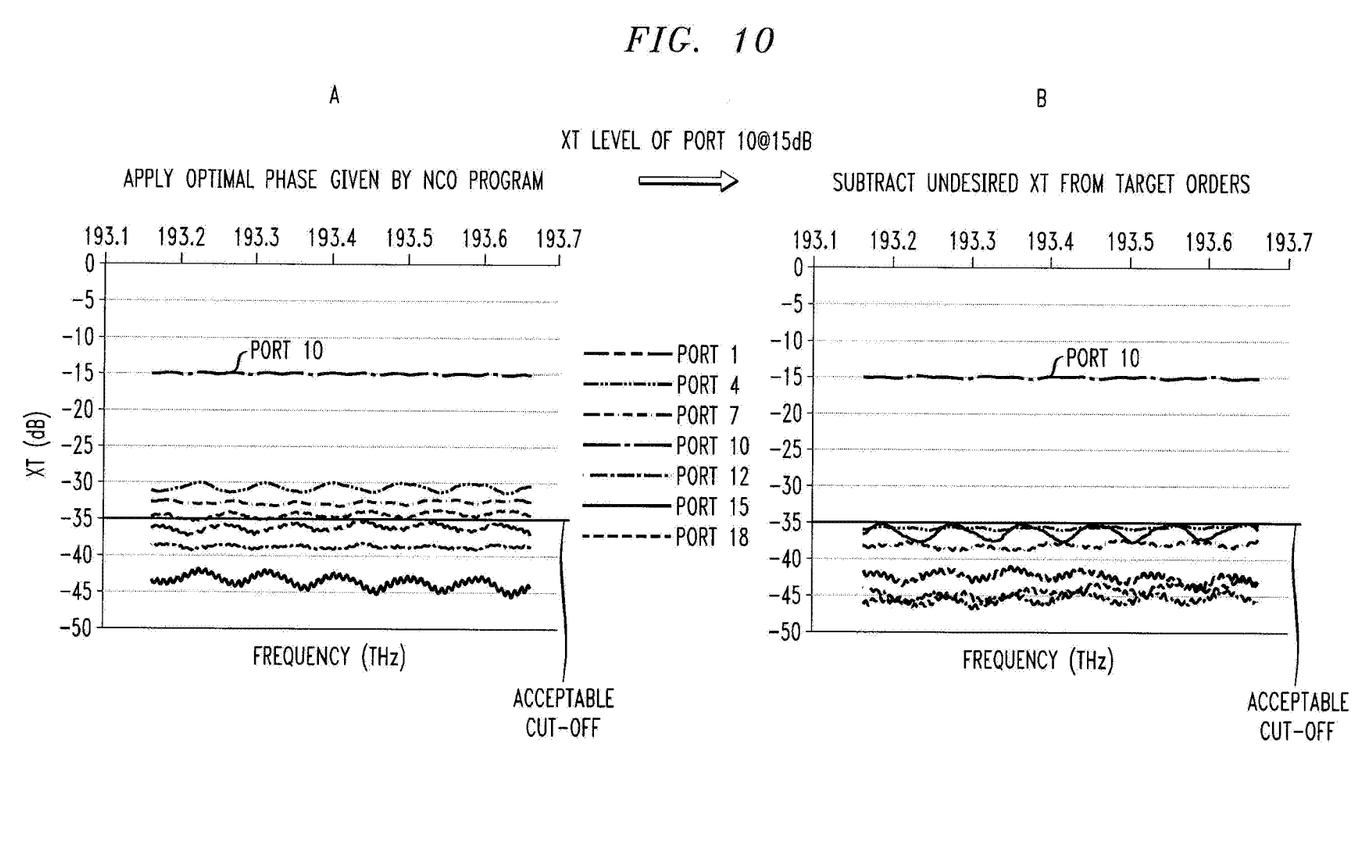
FIG. 10 contains a pair of crosstalk plots, illustrating the improvement provided by performing the second optimization step of the process of the present invention.

FIG. 10 contains a pair of crosstalk plots, illustrating the improvement provided by performing the second step of the inventive process. The information contained in these plots was developed from a prototype utilizing a 1×20 fiber array. Here, "port 10" is the target output port for this 1×20 array. Plot A shows the results at the end of the first step of the optimization process. That is, a programmable hologram is created using the parameters generated by the NCO process to provide beam steering between the input port and output port 10. It is clear that levels of crosstalk above the industry standard −35 dB are still present at non-selected ports 4, 7 and 18 (corresponding to subtraction of $5^{th}$-, $3^{rd}$-. and $-6^{th}$-order in the port arrangement.

After performing the crosstalk suppression process as outlined in FIG. 10, the crosstalk is reduced by the amount as shown in plot B. The optimization techniques of the present invention thus significantly reduce the calibration time, while improving the crosstalk performance of a 1×N WSS, particularly important for a high-port-count switch. It is to be understood that while the results illustrated in FIG. 10 have been developed when a single port (here, "port 10") is selected, the two-step optimization process of the present invention as outlined above may also be used with other ports with different attenuations.

The foregoing description is considered to be only specific embodiments of the disclosure, and is not intended to limit the protection scope of the disclosure. Any variations or modifications readily recognized by a person skilled in the art is presumed to fall within the protection scope of the disclosure. Thus, the subject matter of the present invention is intended to be limited only by the scope of the claims as outlined below.

What is claimed is:

1. A wavelength selective switch (WSS), comprising
   a fiber array, wherein the fiber array comprises a plurality of ports including an input port and multiple output ports;
   a liquid crystal on silicon (LCoS) panel including a control board for providing selected pixel electrode voltage levels associated with displaying a hologram in the form of a phase profile configured to provide switching of a defined wavelength of an incoming optical signal between the input port and one or more of the multiple output ports; and a processor module coupled to the LCoS panel, the processor module creating an optimized phase profile for wavelength selective switching and communicating the optimized phase profile information to the LCoS panel control board, the processor module utilizes a continuous phase-only function associated with optimized beam splitting, defined as $$s(x)=\Sigma_k \mu_k \exp[i\alpha_k]\exp[ikx],$$

where k in an integer index of each of a set of N selected output ports, $\alpha_k$ is a numerical parameter representing a phase of a $k^{th}$ diffraction order, and $\mu_k$ is a numerical parameter representing an amplitude of the $k^{th}$ diffraction order, wherein the processor module is configured to: (1) perform an iterative calculation process of $\eta$ by determining a pair of dump ports to be associated with each selected output port, defining initial values of $\mu$ and $\alpha$, and setting a predetermined attenuation level at the dump ports as a constraint for the iterative calculation process to create an optimized phase profile that satisfies a diffraction efficiency criteria:

$$\eta = \frac{\Sigma_k |c_k|^2}{\Sigma_{m=-\infty}^{+\infty}|c_m|^2}$$

where $c_k$ is a $k^{th}$ Fourier coefficient of the continuous phase-only function, the numerator is the sum of all selected output ports and the denominator is sum over the complete set of multiple output ports; and (2) perform phase adjustments on the optimized phase profile, including phase scaling, pixel number and order subtraction, until crosstalk at all non-selected output ports is less than a predetermined threshold level.

2. The WSS as defined in claim 1, wherein the processor module is configured to perform phase scaling subsequent to the generation of an optimized phase profile to minimize crosstalk present at non-selected output ports by adjusting a phase period to a value slightly different from $2\pi$.

3. The WSS as defined in claim 2, wherein the processor module is further configured to modify a number of individual pixels associated with a phase period to further minimize crosstalk present at non-selected output ports.

4. The WSS as defined in claim 2, wherein the processor module is further configured to identify certain non-selected ports exhibiting unacceptable cross and subtract the diffraction orders associated with these non-selected ports from the optimized phase profile.

* * * * *